(12) United States Patent
Craig et al.

(10) Patent No.: US 6,648,009 B1
(45) Date of Patent: Nov. 18, 2003

(54) TAMPER-PROOF BALL VALVE

(75) Inventors: Paul Craig, Fairburn, GA (US); Giulio Pettinaroli, S. Maurizio (IT)

(73) Assignee: Jomar International, Madison Heights, MI (US)

( * ) Notice: Subject to any disclaimer, the term of this patent is extended or adjusted under 35 U.S.C. 154(b) by 0 days.

(21) Appl. No.: 10/167,715

(22) Filed: Jun. 10, 2002

(51) Int. Cl.[7] .......................... F16K 11/20; F16K 35/06
(52) U.S. Cl. ........................ 137/385; 70/178; 70/180; 73/201; 137/15.03; 137/315.41; 137/382; 137/315.06; 137/883; 137/887; 251/95
(58) Field of Search ................. 137/15.03, 15.22, 137/382, 385, 599.08, 599.11, 599.13, 613, 315.41, 602, 315.06, 883, 887; 70/178, 180, 186, 203; 73/201; 251/95

(56) References Cited

U.S. PATENT DOCUMENTS

| | | | | |
|---|---|---|---|---|
| 179,975 A | * | 7/1876 | Trembley ................. | 137/887 |
| 1,165,672 A | * | 12/1915 | Hilton ..................... | 137/883 |
| 3,187,570 A | | 6/1965 | Mueller ................... | 73/201 |
| 3,272,009 A | * | 9/1966 | Leopold, Jr. et al. ...... | 73/201 |
| 3,296,860 A | * | 1/1967 | Smith et al. ............. | 73/201 |
| 3,296,861 A | * | 1/1967 | Mueller et al. ........... | 73/201 |
| 3,301,051 A | * | 1/1967 | Smith ..................... | 73/201 |
| 3,382,888 A | * | 5/1968 | Mueller et al. ........... | 73/201 |
| 3,853,144 A | * | 12/1974 | Whelan .................. | 137/883 |
| 3,865,130 A | * | 2/1975 | Mullis .................... | 137/385 |
| 4,397,332 A | * | 8/1983 | Sample ................... | 137/385 |
| 5,065,787 A | * | 11/1991 | Lochmann .............. | 137/382 |
| 5,183,078 A | * | 2/1993 | Sorrell ................... | 137/883 |
| 5,467,796 A | * | 11/1995 | Pettinaroli et al. ....... | 137/883 |
| 5,632,300 A | * | 5/1997 | Isringhausen ........... | 137/883 |
| 6,283,153 B1 | | 9/2001 | Brisco et al. .......... | 137/625.47 |

FOREIGN PATENT DOCUMENTS

DE  2147026  * 12/1972 ................ 137/883

* cited by examiner

Primary Examiner—George L. Walton
(74) Attorney, Agent, or Firm—Charles W. Chandler

(57) ABSTRACT

A tamper-resistant by-pass valve prevents an unauthorized user from tampering with the valve when it is in the closed position to block gas flow to a meter being replaced or repaired.

9 Claims, 3 Drawing Sheets

TAMPER-PROOF BALL VALVE

BACKGROUND AND SUMMARY OF THE INVENTION

This invention relates to by-pass valves for servicing a fluid line, and more particularly to a tamper-proof, by-pass valve for natural gas service.

Residential and commercial gas customers have a service stop valve for controlling gas flow to the customer. A supply conduit provides gas to the stop valve which when opened supplies gas to a meter. The gas passes to the customer from the meter through another conduit. It is sometimes necessary for the utility company to change and/or repair the meter and regulator. A by-pass valve and conduit are temporarily connected between the supply conduit and the customer connection to continue service to the customer during such a repair.

Prior art related to this type of service may be found in U.S. Pat. No. 6,283,153 issued Sep. 4, 2001, to Harlin J. Brisco et al. for "Flow Valve"; U.S. Pat. No. 3,187,570 issued Jun. 8, 1965, to Frank H. Mueller for "By-pass For Fluid Meter".

A problem with prior art by-pass valves is that unauthorized personnel can tap into a by-pass port intended to be used as a temporary gas connection. The present invention solves this problem by providing a tamper-proof valve having two security arrangements for protecting the by-pass port.

Typically the by-pass valve is a ball valve having a valve stem with a rectangular operator for opening and closing the ball valve element. The preferred valve body has a by-pass port for connecting a temporary conduit to supply gas to the consumer when the ball valve element is closed. A locking wing is carried on the valve stem. When the valve handle is turned to its fully open position, the locking wing is disposed over the by-pass port, preventing an unauthorized user from using a tool to remove a security plug in the by-pass port. When the ball valve is closed, the locking wing is turned to another position permitting a by-pass hose to be connected to the by-pass port, and permitting a padlock or industry specific device to lock the valve in its closed position.

Another feature of the invention is that the by-pass port is at one end of an internal by-pass passage in the body of the valve. When the by-pass passage is open and the ball valve is closed, gas flows from the supply conduit through the by-pass port and the by-pass passage to the customer's supply conduit. A shutter valve is mounted in the valve body adjacent to the by-pass passage. A special tool is used to open the shutter valve, permitting gas flow through the by-pass passage. The shutter valve can be closed to block the by-pass passage, thus preventing unauthorized access to the gas flowing through the valve, by someone not having means for opening the shutter valve.

The security arrangements of the invention can be used on other types of valves, such as gate valves, butterfly valves and plug valves.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
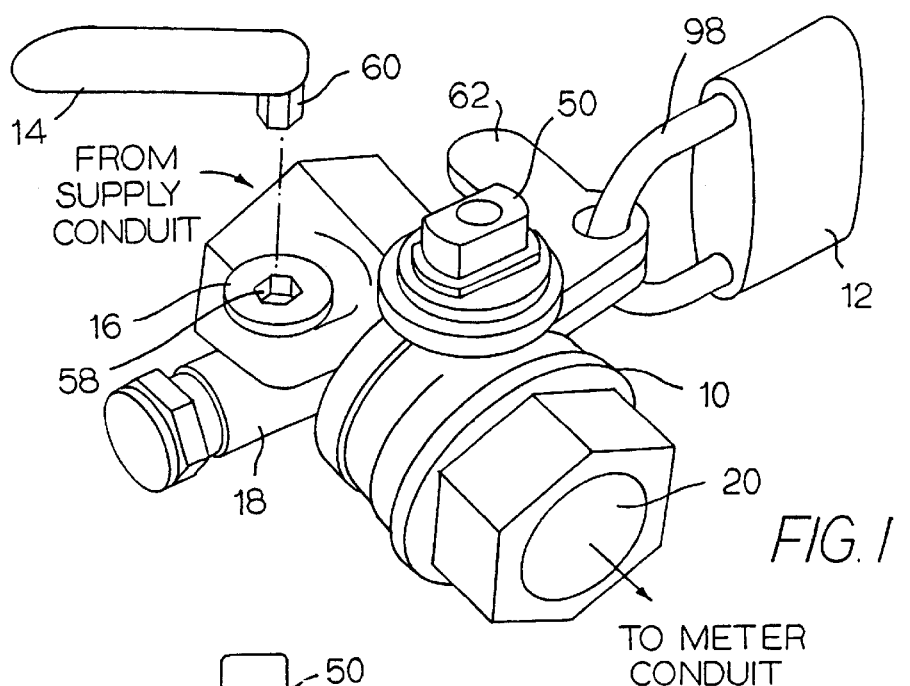
FIG. 1 is a perspective view showing the preferred valve.

Referring to the drawings, FIG. 1 illustrates a preferred tamper-proof bypass valve 10, a locking device 12 for locking the valve in the closed position, and a tool 14 for removing a bypass plug 16 from body 18 of the valve.

Body 18 has a through passage 20 with an inlet opening 22 and an outlet opening 24. The inlet and the outlet openings are threaded in the usual manner for connecting a conduit to the inlet opening and another conduit to the outlet opening.

Figure 7:
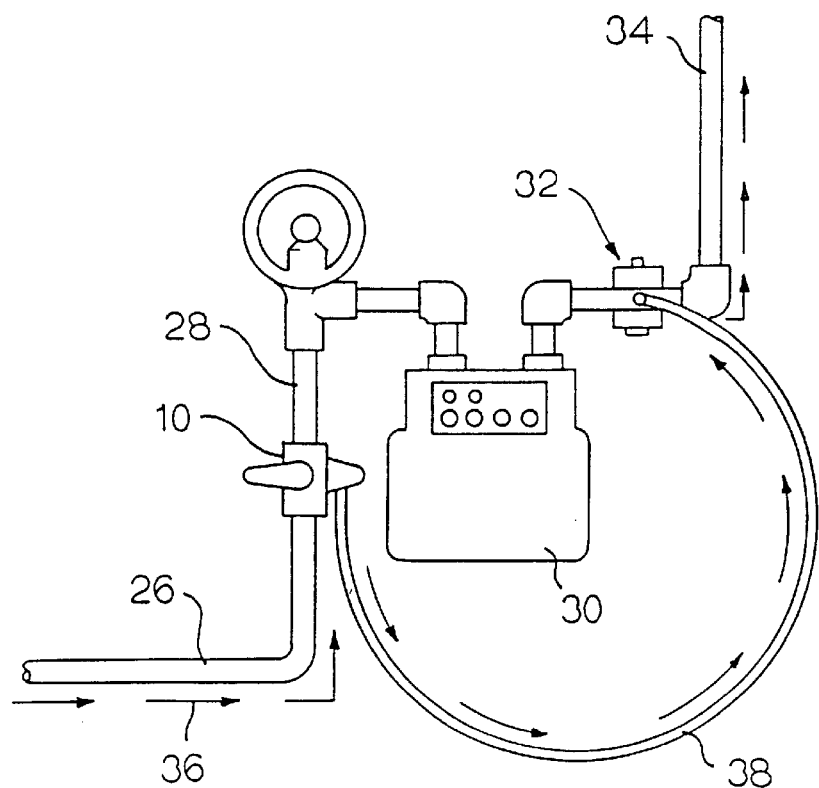
FIG. 7 is a view showing a typical gas delivery system with the by-pass valve in the by-pass condition.

Referring to FIGS. 1 and 7, by-pass valve 10 is connected in a service system, which includes a gas supply conduit 26, a meter conduit 28, a gas meter 30, and a second by-pass valve 32 for supplying gas to a customer service line 34. Arrows 36 illustrate gas flow through a bypass conduit 38 connected to valves 10 and 32 to isolate meter 30 for service or replacement. Valves 10 and 32 are similar. The gas flows from the inlet side of valve 10 to the outlet side of valve 32.

Figure 3:
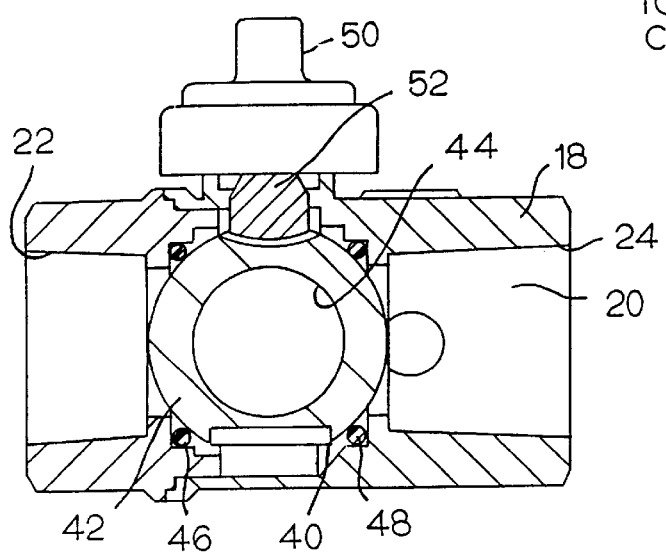
FIG. 3 is a partially sectional view of the valve as seen along the lines 3—3 of FIG. 2.
Figure 2:
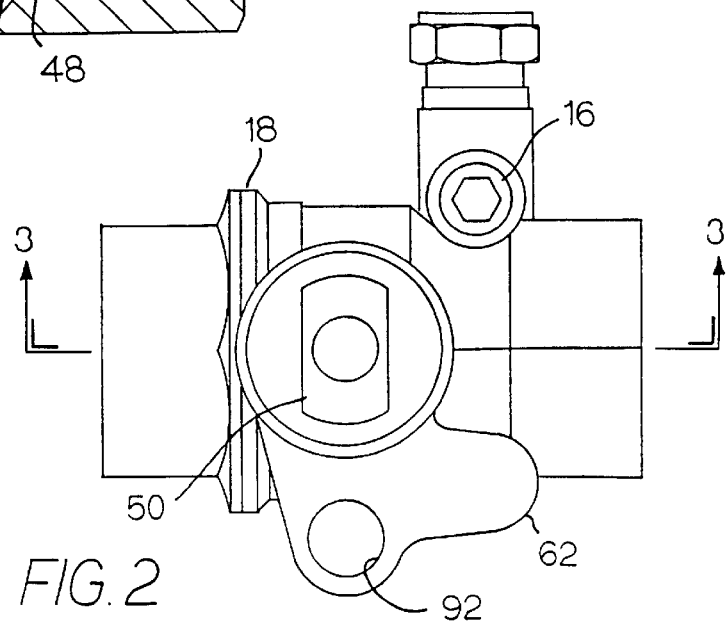
FIG. 2 is a top plan view of the preferred valve in the closed position.

Referring to FIGS. 2 and 3, valve body 18 has a ball valve chamber 40 between inlet opening 22 and outlet opening 24. A conventional ball valve 42 is slidably, rotatably mounted in the valve chamber for motion between a closed position, illustrated in FIG. 3, blocking gas flow from inlet opening 22 to outlet opening 24, and an open position, illustrated in FIG. 6, in which the gas flows through a ball valve opening 44 from the inlet opening to the outlet opening. O-rings 46 and 48 provide a seal between the valve and the valve chamber.

A handle 50 mounted on a valve stem 52 attached to the ball valve, provides means for turning the ball valve between the open and closed positions. The operator has a four-sided shape for receiving a wrench (not shown) for turning the valve.

Figure 5:
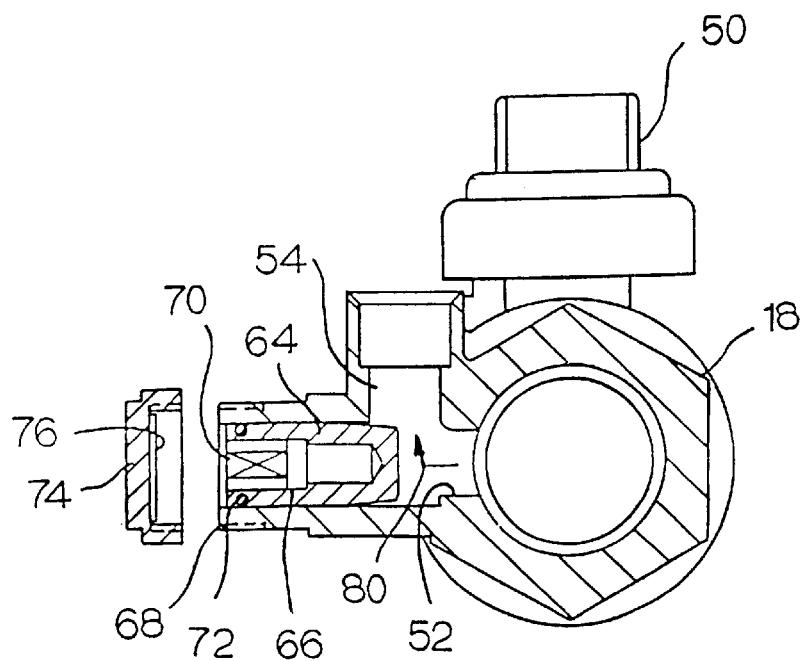
FIG. 5 is a partially sectional view showing the by-pass passage and shutter valve in the open position.
Figure 6:
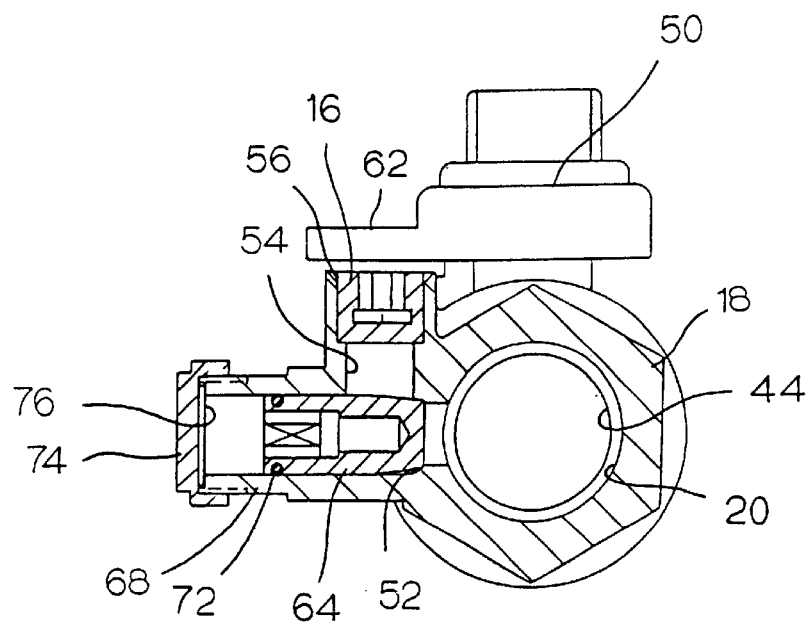
FIG. 6 is a view similar to FIG. 5 but showing the shutter valve in the closed position.

Referring to FIGS. 5 and 6, the valve body has an internal bypass passage 52 fluidly connected to passage 20. The by-pass passage extends laterally from passage 20, and then upwardly at 54 to an internally threaded by-pass port 56 (which opens on the same side of the body as handle 50 is disposed). By-pass plug 16 threadably mounted in by-pass port 56.

Referring to FIG. 1, by-pass plug 16 has a hexagonal opening 58 for receiving an Allen wrench. Other types of security devices could be employed as well as other types of openings, such as a special Torx opening. The Allen wrench is turned in the clockwise direction with the plug to insert the plug to the FIG. 6 position, flush with the top edge of by-pass port 56. The Allen wrench is turned in the counter clockwise direction to remove plug 16 from the by-pass port, for connecting by-pass conduit 38.

Handle 50 has a locking solid tab wing 62 on valve stem 52, which rotates with the ball valve element between its open and closed positions.

A security shutter valve 64 is threadably mounted in a shutter valve opening 66 in a boss 68. Opening 66 extends laterally from through passage 20. The shutter valve is basically a solid plug having an internal tool-receiving opening 70. An O-ring seal 72 provides a gas tight seal between the shutter valve opening and the shutter valve. Shutter valve opening 70 has a special female configuration for mating with a tool (not shown) having a complementary male configuration. A security cap 74 and a washer 76 are mounted on the end of the shutter valve opening.

The shutter valve is movable between a closed position blocking gas flow through by-pass passage 52, as viewed in FIG. 6, and an open position permitting gas to flow from supply conduit 26, into one end of the valve body and out through bypass port 56.

Figure 4:
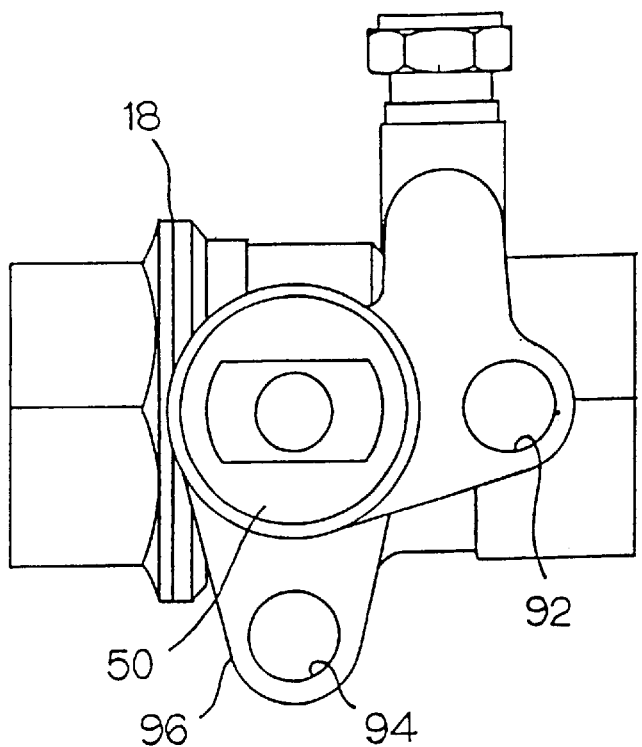
FIG. 4 is a view similar to FIG. 2 but showing the locking wing in a position blocking access to the by-pass port.

Locking wing 62 in the position of FIG. 6, overlaps the by-pass port and blocks removal of bypass plug 16. In this position of the locking wing, ball valve 42 is open, permitting gas to flow from supply line conduit 26 to the meter conduit 28. To isolate meter 30, the user turns the locking wing about 45° from its position as viewed in FIG. 4, in the clockwise direction. He removes by-pass plug 16 and installs one end of by-pass conduit 38 in by-pass port 56. He then removes security cap 74, and turns security shutter valve from the fully closed position, illustrated in FIG. 6, to the fully open position, illustrated in FIG. 5. The user then turns valve handle 50 to the FIG. 2 position, to close ball valve 42 and isolate the meter for service or replacement. Gas flow is then from supply conduit 26 through the by-pass passage in valve 10 and out through by-pass conduit 38.

The process is repeated for valve 32. Note that the by-pass part of valve 32 is in the downstream side of the valve. The gas flows through the by-pass passage of valve 32 to the customer service line.

To place the meter back in service, the user slowly turns the handle/operator in the counter clockwise direction to fluidly connect supply conduit 26 to meter conduit 28. He turns the shutter valve to its fully closed position, illustrated in FIG. 6. He then installs security cap 74, removes by-pass conduit 38 from the by-pass port and reinstalls plug 16. He then completely opens the ball valve to its normal functioning position as shown is FIG. 4. He reverses this process to isolate the meter.

When valve 10 is in its fully closed position, opening 92 in the locking wing overlaps a similar opening 94 in a wing 96 that is fixed with respect to the body. He inserts key-operated locking device 12 by passing shackle 98 through both openings 92 and 94, and then locking the shackle with respect to the body of device 12.

This procedure prevents tampering with the valve in its closed position.

In some cases, by-pass conduit 38 need not be used. In such a structure, valve 10 is closed, and a tank of gas, not shown, can be connected to the by-pass port of closed valve 32, to isolate meter 30, while continuing gas flow to the customer service conduit 34.

Having described my invention, I claim:

1. A tamper-proof valve, comprising:
a valve body having a valve chamber, and a through passage with an inlet opening and an outlet opening communicating with said valve chamber;
a valve element disposed in the valve chamber and being movable between a valve open position and a valve closed position, said valve chamber being aligned with said through passage when the valve is in said open position;
said valve element having a rotatable stem for turning the valve element between said valve open position and said valve closed position;
the valve body having a by-pass port and a by-pass passage fluidly connecting the by-pass port to the through passage;
a by-pass plug removably mounted in the by-pass port, the by-pass plug being removable by engagement with a tool; and
a locking element mounted on the rotatable stem so as to be movable therewith between a fully open position blocking access to the by-pass plug to prevent removal thereof, and a fully closed position permitting access to the by-pass plug by said tool.

2. A tamper-proof valve as defined in claim 1, in which the locking element is disposed in said fully open position when the valve element is in said valve open position.

3. A tamper-proof valve as defined in claim 1, in which the body has a locking structure fixed thereto, and the locking element is disposed in said fully closed position when the valve element is in the valve closed position, and including a locking device connectable to said locking element and said locking structure to prevent movement of the locking element towards said fully open position.

4. A tamper-proof valve as defined in claim 1, in which the valve body has a shutter valve opening having an inner end opening to the by-pass passage, and a threaded outer end for receiving a shutter valve, and including a tamper-proof cap mounted on the shutter valve opening outer end for blocking access to the shutter valve.

5. A tamper-proof valve as defined in claim 1, in which the body has a protuberance having a first passage laterally aligned with the through passage, the first passage being internally threaded for receiving a shutter valve; and the protuberance has a second internally threaded passage aligned at right angles to the first passage, for receiving the by-pass plug.

6. A tamper-proof valve, comprising:
a valve body having a valve chamber, and a through passage with an inlet opening and an outlet opening communicating with said valve chamber;
a rotatable valve element disposed in the valve chamber and being movable between a valve open position and a valve closed position, said valve element having a valve passage therethrough, said valve passage being aligned with said through passage when the valve is in said open position;
said valve element having a rotatable stem for turning the valve element between said valve open position and said valve closed position;
the valve body having a by-pass port and a by-pass passage fluidly connecting the by-pass port to the through passage;
a by-pass plug removably mounted in the by-pass port the by-pass plug being removable by engagement with a tool;
a shutter valve mounted in the body adjacent the by-pass passage, and moveable when the valve element is in said closed position, between an open position permitting flow through the by-pass passage and a closed position in which the shutter valve blocks fluid flow through the by-pass passage; and
a locking element mounted on the valve element stem so as to be movable with the valve element between a first position blocking access to the by-pass plug to prevent removal thereof, and a second position permitting access to the by-pass plug by said tool.

7. A tamper-proof valve as defined in claim 6, including a by-pass conduit having one end threadably connected to the by-pass port.

8. A tamper-proof valve, comprising:

a valve body having a valve chamber, and a through passage with an inlet opening and an outlet opening communicating with said valve chamber;

a rotatable ball valve disposed in the valve chamber and being movable between a valve open position and a valve closed position, said ball valve having a valve passage therethrough, said valve passage being aligned with said through passage when the ball valve is in said open position;

said ball valve having a rotatable stem for turning the ball valve between said valve open position and said valve closed position;

the valve body having a by-pass port and a by-pass passage fluidly connecting the by-pass port to the through passage;

a by-pass plug removably mounted in the by-pass port; and a shutter valve mounted in the body adjacent the by-pass passage, and moveable when the valve element is in said closed position, between an open position permitting flow through the by-pass passage only after said by-pass plug has been removed and a closed position in which the shutter valve blocks fluid flow through the by-pass passage.

9. A method for isolating a gas meter from a gas supply line, comprising the steps of:

providing a valve body having a valve chamber and a through passage communicating with said valve chamber;

disposing a rotatable valve in the valve chamber so as to be moveable therein between a valve open position and a valve closed position;

turning the valve such that the valve chamber is aligned with said through passage to pass a gas to a conduit having a meter to be serviced;

turning a stem connected to said valve from said valve open position to said valve closed position;

providing the valve body with a by-pass port and a by-pass passage fluidly connected to the through passage;

removing a by-pass plug from the by-pass port;

connecting a by-pass conduit to the by-pass port of the valve body;

connecting a locking device to the valve to the valve body to prevent movement of the valve from the valve closed position, whereby gas supplied to the valve body passes to the by-pass conduit; and disconnecting the locking device from the valve body and the valve, and then turning the valve stem to move the valve to the valve open position and the locking element to a position in which the locking element blocks access to the by-pass port.

* * * * *